United States Patent [19]

Nagano

[11] Patent Number: 4,736,651
[45] Date of Patent: Apr. 12, 1988

[54] SPEED CONTROL DEVICE FOR A BICYCLE

[75] Inventor: Masashi Nagano, Izumi, Japan

[73] Assignee: Shimano Industrial Company Limited, Osaka, Japan

[21] Appl. No.: 909,026

[22] Filed: Sep. 17, 1986

[30] Foreign Application Priority Data

Sep. 27, 1985 [JP] Japan .................... 60-148481[U]

[51] Int. Cl.$^4$ .................... G05G 1/04; G05G 5/06; B60K 20/00
[52] U.S. Cl. .................... 74/523; 74/527; 74/475
[58] Field of Search .................... 74/527, 531, 539, 540, 74/489, 475, 502.2, 501.6; 192/48.1, 48.3; 280/289 H, 236

[56] References Cited

U.S. PATENT DOCUMENTS

| 3,352,173 | 11/1967 | Freeland | 280/236 |
| 4,325,267 | 4/1982 | Kojima | 74/475 |
| 4,454,784 | 6/1984 | Shimano | 74/475 |

FOREIGN PATENT DOCUMENTS

| 417183 | 2/1947 | Italy | 280/236 |
| 208680 | 5/1940 | Switzerland | 280/236 |

Primary Examiner—Gary L. Smith
Assistant Examiner—Vinh Luong
Attorney, Agent, or Firm—Stevens, Davis, Miller & Mosher

[57] ABSTRACT

The device includes a positioning mechanism which is provided with a first end engaging portion for setting the low speed change stage, a second end engaging portion for setting the high speed change stage, and at least one intermediate engaging portion for setting the middle speed change stage. The device also includes an engaging member engageable with one of the engaging portions. In operation, a derailleur is actuated by the forward operation of a lever body of the speed control device to pull a control wire, and backward operation of the lever body loosens the control wire. The positioning member is provided with a displacement engaging portion which is in continuation of the intermediate engaging portion and is displaced in the direction of forward operation of the lever body with respect to the intermediate engaging portion. As a result, a chain guide of the derailleur can be positioned within a stable region with respect to each sprocket of a multistage sprocket assembly when the lever body is operated forwardly and backwardly.

6 Claims, 2 Drawing Sheets

SPEED CONTROL DEVICE FOR A BICYCLE

FIELD OF THE INVENTION

The present invention relates to a speed control device for a bicycle, and more particularly, to a speed control device for a bicycle which actuates through a control wire a derailleur having a return spring by forward operation of the device to pull the control wire against the return spring and by backward operation to loosen the control wire.

BACKGROUND OF THE INVENTION

Generally, bicycle speed control devices operate the control wire forwardly or backwardly to actuate the derailleur so that a chain guide thereof shifts a driving chain to one desired sprocket of a multistage sprocket assembly provided at a crank shaft or a rear hub of the bicycle. Most speed control devices employ a positioning mechanism provided with a positioning member having a plurality of engaging portions for setting the speed change stages and at least one engaging member engageable with one of the engaging portions so that a lever is operated to engage the engaging member with one engaging portion to thereby change the speed change stage and position the lever body at the desired speed change stage.

In a case where the chain is shifted to one sprocket of the multistage sprocket assembly, the chain, even when somewhat shifted from the proper engaging portion, does not make contact at its link plate with the sprocket, because each sprocket has a stable region of a predetermined width by which the generation of noise is prevented. However, the chain, when shifted to the desired sprocket from the position out of the stable region, makes contact with the sprocket or a chain guide to produce noises.

In other words, the stable region is different in width due to a configuration of the chain, the shape of teeth at the sprocket and a combination of sprockets at the multi-stage sprocket assembly, but when the chain is positioned within the stable region, there is no risk of generating noises.

With respect to bicycle speed control devices which use the control wire to operate the derailleur and set the speed change stage of the lever body by use of the positioning mechanism, the positioning mechanism sets the speed change stage at the same position, when the wire is operated by a lever body forwardly or backwardly. Moreover, the control wire varies in its effective stroke, such that the chain guide at the derailleur is placed in a different position when the control wire is operated forwardly or backwardly by the lever body.

It is not problematical that the chain guide is positioned within the stable region during both the forward operation and backward operation of the control wire, but a problem is created in that when the chain guide is set to be positioned within the stable region upon either one of the forward and backward operations, the chain-guide is shifted out of the stable region at the other operation.

SUMMARY OF THE INVENTION

An object of the invention is to provide a speed control device for a bicycle which can maintain the chain guide at the derailleur always in the stable region at the speed change stage set by the positioning mechanism even when the position of the chain guide at the derailleur moved by the forward operation of the lever body is shifted from that of the chain guide moved by the backward movement of the same.

The present invention is characterized in that the position where the lever body is operated forwardly is made different from that where it is operated backwardly, and the lever body is positioned by the positioning mechanism, thereby enabling the chain guide to be maintained always in the stable region.

In detail, the speed control device of the invention, which actuates a derailleur having a return spring by the forward operation of the device to pull the control wire against the return spring and by the backward operation to loosen the same to thereby change the bicycle speed, is provided with, a fixing member; a lever body supported rotatably thereto and adapted to be connected to the control wire; and a positioning mechanism comprising a positioning member having a first end engaging portion for setting the high speed change stage and a second end engaging portion for setting the low speed change stage and at least one intermediate engaging portion for setting the middle speed change stage, and an engaging member engageable with one of the engaging portions. The positioning member is also provided with a displacement engaging portion which is in continuation of the intermediate engaging portion and is displaceable in the direction of forwardly operating the lever body.

Thus, the lever body is operated forwardly to pull the control wire, thereby enabling the chain guide at the front or rear derailleur to be shifted from a smaller diameter sprocket to a larger diameter one. The lever body, when intended to select the middle speed change stage during the forward operation, is positioned by use of the displacement engaging portion, whereby the chain guide can be positioned properly to a middle diameter sprocket, in other words, within the aforesaid stable region.

The lever body is operated backwardly to loosen the control wire, therby shifting the chain guide by the return spring from the larger diameter sprocket to the smaller diameter one. When the middle speed change stage is intended to be selected during the backward operation of the lever body, the intermediate engaging portion sets the lever body in position, whereby the chain guide is positioned properly within the stable region with respect to the middle diameter sprocket.

In addition, when the smaller and larger diameter sprockets are selected for changing the bicycle speed, the first and second end engaging portions of course are used to set the lever body in position.

The displacement engaging portion need only be displaced from the intermediate engaging portion in the direction of the forward operation of the lever body, but it is preferable that the displacement engaging portion is displaced in the direction of forward operation of the lever body and radially outwardly with respect to the axis of rotation thereof so that the paths of movement of the engaging member relative to the positioning member when the lever body is operated forwardly and backwardly are changed radially outwardly and inwardly of the positioning member.

These and other objects of the invention will become more apparent from the detailed description and examples which follow.

DETAILED DESCRIPTION OF THE INVENTION

Figure 1:
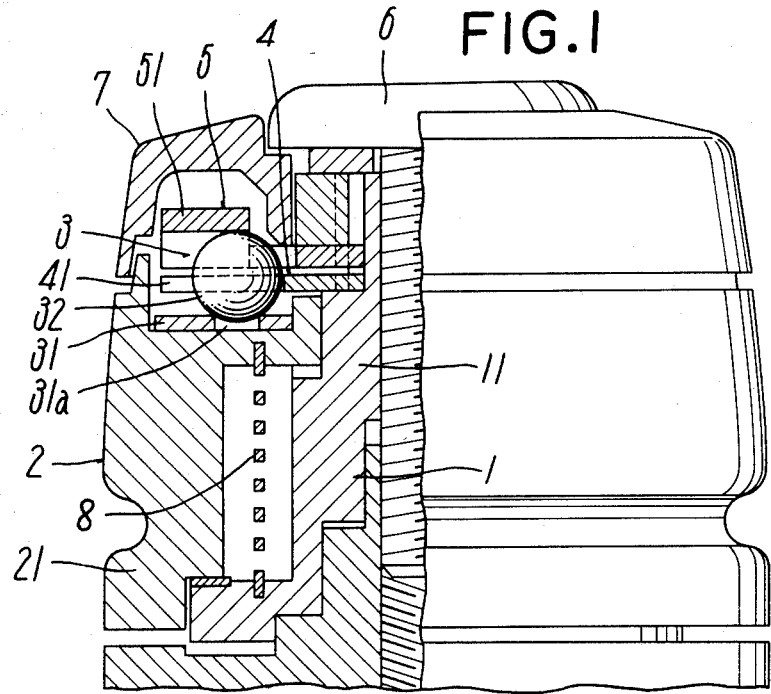
FIG. 1 is a partially cut away front view of a first embodiment of a speed control device of the present invention.

A speed control device shown in FIG. 1 is applied to a front derailleur used together with a front three-stage speed change sprocket assembly. The speed control device is provided with a fixing member 1 having a tubular lever shaft 11, a lever body 2 which is operated forwardly to pull a control wire fixed at its one end to the derailleur and backwardly to loose the same to thereby actuate the front derailleur, and a positioning mechanism 3 for the lever body 2. Fixing member 1 is fixed to the bicycle frame by use of welding or a fixing means, such as a band.

The lever body 2 comprises a cylindrical boss 21 supported rotatably to the lever shaft 11 and a control (not shown) extending radially outwardly from one side of the boss 21.

The positioning mechanism 3 comprises a disc-like positioning member 31 having a first end engaging portion 31a for setting the low speed change stage, a second end engaging portion 31c for setting the high speed change stage, and an intermediate engaging portion 31b for setting the middle speed change stage. Positioning mechanism 3 also includes an engaging member 32 engagable with one of the engaging portions 31a through 31c, the engaging portions 31a to 31c being arranged circumferentially in pitch corresponding to configuration of the sprocket at the three stage speed change sprocket assembly. The positioning member 31 is supported onto one axial end of the boss 21. Engaging member 32 is supported to the fixing member 1 through a leaf spring 5 and a holder 4 having holding portions 41 and supported nonrotatably to the lever shaft 11. Leaf spring 5 biases the engaging member 32 toward the positioning member 31, thereby enabling the engaging member 32 to be maintained in engagement with one of the engaging portions 31a through 31c.

Figure 2:
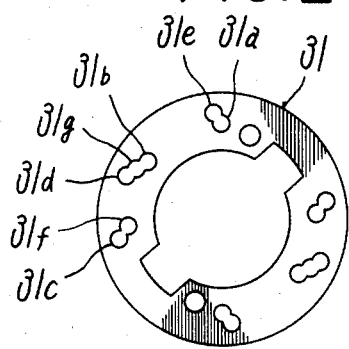
FIG. 2 is a plan view showing only the positioning member of the first embodiment.
Figure 3:
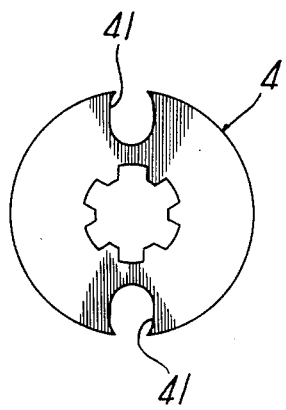
FIG. 3 is a plan view showing only the holder in the first embodiment.
Figure 4:
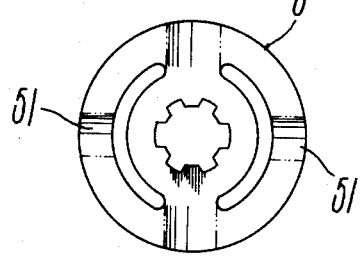
FIG. 4 is a plan view showing only the leaf spring in the first embodiment.
Figure 5:
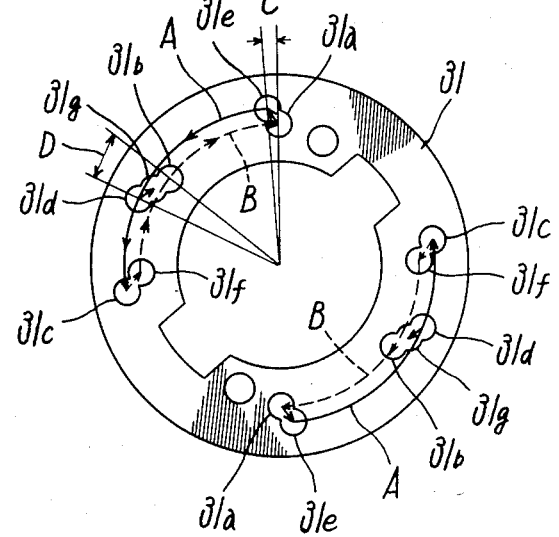
FIG. 5 is an illustration of the speed changing process.
Figure 6:
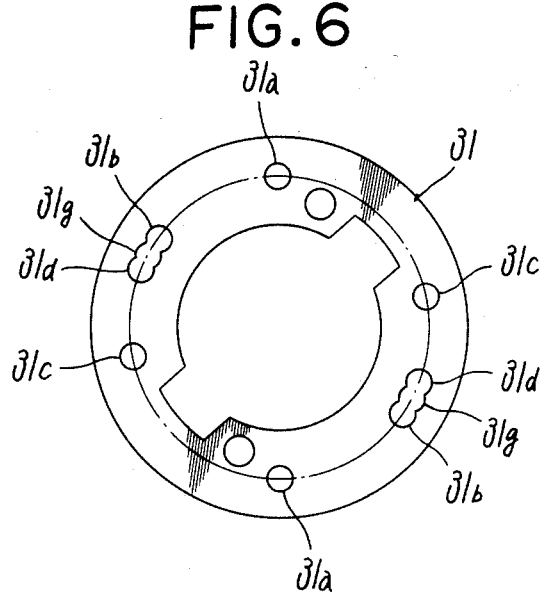
FIG. 6 is an enlarged plan view of a positioning member in a second embodiment of the invention.

In the first embodiment shown in FIGS. 1 through 5, the positioning member 31, as shown in FIGS. 2 and 5, is provided with displacement engaging portions 31d in continuation of the intermediate engaging portions 31b and displaced circumferentially in the direction of forward operation of the lever body 32 respectively. As a result, when the lever body 2 is operated forwardly, each engaging member 32 engages with the displacement engaging portion 31d, and when the lever body 2 is operated backwardly, each engaging member 32 is adapted to engage with the intermediate engaging portion 31b.

Each displacement engaging portion 31d is displaced further radially outwardly of the positioning member 31 with respect to the intermediate engaging portion 31b.

Each first end engaging portion 31a and intermediate engaging portion 31b are arranged on the same circle and each second end engaging portion 31c and displacement engaging portion 31d are arranged on the same circle. The first end engaging member 31a is provided with a first guide portion 31e in continuation thereof so that, when the lever body 2 is operated forwardly, the first guide portion 31e guides the engaging member 32 to a circumferential path A positioned radially outwardly of the positioning member 31 and passing the displacement engaging portion 31d as shown by the solid line in FIGS. 2 and 5. Also, the second end engaging portion 31c is provided with a second guide portion 31f for guiding the engaging member 32 to a circumferential path B positioned radially inwardly of the positioning member 31 and passing the intermediate engaging portion 31b.

In the above-mentioned construction, the engaging member 32, when the lever body 2 is operated forwardly, travels on the radially outside path A relative to the positioning member 31 and when the same is operated backwardly, travels similarly on the radially inside path B. In the above said construction, the engaging portions 31a-31d and the guide portions 31e, 31f are through-bores respectively. Alternatively, they may be formed of recesses respectively.

The displacement engaging portions 31d shown in FIGS. 2 and 5 are each displaced at an angle of about 12° in the direction of the forward operation of the lever body 2, and also a spare engaging portion 31g is provided between the displacement engaging portion 31d and the intermediate engaging portion 31b.

In addition, the guide portions 31e and 31f are formed to maintain engagement between them and engaging member 32, which may alternatively be formed to merely guide the same.

The engaging members 32 each employ a ball and may alternatively employ a roller, or may be formed in any member other than a rolling member.

The leaf spring 5 for biasing the engaging members 32 toward the positioning member 31 is formed in a disc having at the center a non-round bore to be fitted nonrotatably onto the utmost end of lever shaft 11 and provided opposite to the engaging members 32 with holding portions 51 each semicylindrical in section so that the engaging members 32 are prevented from rotating together with the positioning member 31, but are free to move radially thereof. In addition, the holding portions 51 may be formed in elongate slots respectively.

In addition, in FIG. 1, reference numeral 6 designates a mounting screw screwed with a threaded bore at the lever shaft 11, and reference numeral 7 designates a cover for covering the positioning mechanism 3. A referential numeral 8 designates a spring connecting the lever body 2 and the fixing member 1 to bias the lever body 2 away from the fixing member 1.

In the present invention constructed as above-mentioned, when the lever body 2 is operated forwardly against the return spring, in the state where the engaging member 32 engages with the first end engaging portion 31a, in other words, the chain is guided by the chain guide to engage with the smaller diameter low speed sprocket at the front three stage speed change sprocket assembly, each engaging member 32, as shown in FIG. 5, is guided from the first end engaging portion 31a to the first guide portion 31e and travels along the outside path A to engage with the displacement engaging portion 31d. As a result, the chain is guided by the chain guide to be shifted from the smaller diameter sprocket to the middle diameter one. In this case, the lever body 2 rotates excessively to an extent of the sum of an amount C corresponding to the circumferential displacement from the first end engaging portion 31a to the first guide portion 31e and amount D corresponding to the circumferential displacement from the intermediate engaging portion 31b to the displacement engaging portion 31d. Hence, the chain guide is over-shifted with respect to the middle diameter sprocket and then is shifted thereto.

In a case where the chain guide stops outside the stable region and the lever body 2 is positioned corresponding to the displacement engaging portion 31d and the chain having engaged with the middle diameter sprocket makes contact therewith or with the chain guide to generate noises, the lever body 2 need only be operated slightly backwardly to engage the engaging member 32 with the spare engaging portion 31g. In this case, the spare engaging portion 31g is not indispensable, but when the chain is shifted from the smaller diameter sprocket to the middle diameter one at the three stage speed change sprocket assembly, the chain guide must be overshifted to a greater extent whereby generation of noises is facilitated. Hence, it is preferable that the spare engaging portion 31g is provided to turn the lever body 2 stepwise backwardly to an extent of the predetermined stroke with respect to an amount of overshift.

The lever body 2 is further operated forwardly to allow the engaging member 32 to move through the outside path A to engage with the guide portion 31c, the chain being shifted from the middle diameter sprocket to the larger diameter high speed sprocket. In this case, when the chain having engaged with the larger diameter sprocket contacts therewith or with the chain guide to create noise, each engaging member 32 need only engage with the second guide portion 31f in order to avoid the generation of noises.

Next, in a case where the lever body 2 is operated backwardly, in other words, in the direction of restoring the return spring, and in condition of engaging the engaging members 32 with the second end engaging portions 31c, the engaging members 32 are guided from the second end engaging portions 31c to the second guide portions 31f and move through the inside paths B to engage the intermediate engaging portions 31b respectively. Hence, the chain is shifted from the larger diameter sprocket to the middle diameter one, and the lever body 2 is further operated backwardly to move the engaging members 32 through the inside path B, thereby engaging the engaging members 32 with the first end engaging portions 31a respectively.

Thus, the lever body 2, when operated forwardly and backwardly for changing the bicycle speed, can be shifted by the displacement D from the forward operation position to the backward operation position, thereby enabling the chain guide to stop within the stable region during both the forward and backward operations. Accordingly, the chain having been shifted avoids generation of noises.

Alternatively, the first guide portion 31e may be omitted, and each engaging member 32, when the lever body 2 is forwardly operated, may move from the first end engaging portion 31a to displacement engaging portion 31d through the inside path B and intermediate engaging portion 31b, engage with the displacement engaging portion 31d, and then move through the outside path A to engage the second end engaging portion 31c. However, since the provision of the first guide portion 31e can ensure a large amount of overshift in the forward operation of lever body 2, the chain further facilitates its shifting from the smaller diameter sprocket to the middle diameter one.

In other words, especially when the chain is shifted from the smaller diameter sprocket to the middle diameter one at the three stage speed change sprocket assembly, the chain is not easy to engage with the latter sprocket, whereby the chain guide is preferred to be overshifted to a large extent.

Also, in a case where the first guide portion 31e is provided and each engaging member 32 passes on the outside path A when the lever body 2 is operated forwardly, contact resistance of the positioning member 31 to the engaging member 32 biased by the leaf spring 5 toward it can be reduced to the extent that the leaf spring 5 is easier to deflect than when the engaging member 32 passes through the inside path B. As a result, lever body 2, which must be operated forwardly by a force overcoming the return spring, can be operated with a light touch.

The displacement engaging portions 31d and second end engaging portions 31c are slanted with respect to the outside paths A and inside paths B respectively, whereby engaging resistance of each engaging member 32 to the displacement engaging portion 31d and second end engaging portion 31c is made larger with respect to the spring force of the return spring. Hence, the lever body 2 can easily maintain its positioning condition.

When the lever body 2 is operated backwardly, the engaging members 32 are adapted to pass on the inside paths B, whereby contact resistance of the engaging member 32 to the positioning member 32 can be made larger to the extent that the leaf spring 5 is not easily defleted in comparison with when the engaging members 32 pass on the outside paths A. As a result, when the engaging members 32 engage with the intermediate engaging portions 31b respectively, the lever body 2 can easily maintain its positioning condition, and also when the engaging members 32 engage with the intermediate engaging portions 31b and first end engaging portions 31a respectively, the clicking feel can be enhanced.

Alternatively, in the first embodiment, the first guide portions 31e and second guide portions 31f may be omitted and the first end engaging portions 31a, intermediate engaging portions 31b, displacement engaging portions 31d, and second end engaging portions 31c, may be arranged on the same circle concentric with the positioning member 31. In this case, the displacement engaging portions 31d are displaced only in the direction of forward operation of the lever body 2, but not radially outwardly of the positioning member 31. Also, the positioning member 31 may be integral with the lever body 2.

Alternatively, the speed control device of the invention may be used together with the rear multistage sprocket assembly so as to actuate a rear deraileur.

In this case, the first end engaging portions 31a set the high speed change stage and the second end engaging portions 31c the low speed change stage.

As seen from the above, the positioning member 31 having at least three engaging portions 31a, 31b and 31c is provided with at least one displacement engaging portion 31d in continuation of the intermediate engaging portion 31b and displaced with respect thereto in the direction of forward operation of the lever body 2, so that when the lever body 2 is operated forwardly, the engaging member 32 engages with the displacement engaging portion 31d, and when operated backwardly, the same engages with the intermediate engaging portion 31b, thereby allowing the engaging member 32 to change its position when the lever body 2 is operated forwardly from that when it is operated backwardly. Hence, the chain guide at the derailleur can be stopped in the stable region during both the forward and backward operations of the lever body 2. Accordingly, the chain, when shifted by the chain guide, avoids contact with the chain guide or the sprocket, thereby preventing the generation of noises.

Moreover, since the lever body 2 is naturally excessively rotatable corresponding to an amount of displacement of each displacement engaging portion 31d, the chain guide at the derailleur is overshifted with respect to a desired sprocket for shifting the chain thereto, thereby enabling the speed change efficiency to be improved to that extent.

Also, the spare engaging portions 31g are provided between the intermediate engaging portions 31b and the displacement engaging portions 31d to thereby enable a fine adjustment of the position of lever body 2 when operated forwardly, whereby the amount of displacement of each displacement engaging portion 32 increases and the speed change efficiency is further improved, thereby preventing the generation of noises.

Although several embodiments have been described, they are merely exemplary of the invention and not to be construed as limiting, the invention being defined solely by the appended claims.

What is claimed is:

1. A speed control device for a bicycle for actuating a derailleur having a return spring whereby forward operation of said device is adapted to pull a control wire against said return spring and backward operation of said device is adapted to loosen said control wire, thereby changing the bicycle speed, said speed control device comprising:
   (a) a fixing member adapted to fix said speed control device to said bicycle,
   (b) a lever body supported rotatably to said fixing member and adapted to be connected with said control wire,
   (c) a positioning mechanism comprising a positioning member supported on said lever body and having
      (i) a first end engaging portion for setting one of a low speed change stage and a high speed change stage, (ii) a second end engaging portion in continuation of said intermediate engaging portion for setting the other of said low speed change stage and said high speed change stage, (iii) at least one intermediate engaging portion for setting a middle speed change stage and (iv) a displacement engaging portion in continuation of said intermediate engaging portion for setting said middle speed change stage and displaced circumferentially in a direction of forward operation of said lever body with respect to said intermediate engaging portion, said positioning mechanism further comprising an engaging member supported to said fixing member and engageable with one of said first end engaging portion, said second end engaging portion and said intermediate engaging portion.

2. A speed control device for a bicycle according to claim 1, wherein said displacement engaging portion is displaced further radially outwardly than said intermediate engaging portion with respect to an axis of rotation of said lever body.

3. A speed control device for a bicycle according to claim 1, wherein said displacement engaging portion is displaced further radially outwardly than said intermediate engaging portion with respect to an axis of rotation of said lever body, and said second engaging portion is provided with a second guide portion which guides said engaging member to a first circumferential path passing through said intermediate engaging portion and positioned further radially inwardly of said positioning member than a second circumferential path passing through said displacement engaging portion.

4. A speed control device for a bicycle according to claim 3, wherein said first end engaging portion is provided with a first guide portion for guiding said engaging member to said second circumferential path passing through said displacement engaging portion 5. A speed change device for a bicycle according to claim 1, wherein said displacement engaging portion and said second end engaging portion are arranged on a same circle having its center at a central axis of said positioning member corresponding substantially to an axis of rotation of said lower body.

6. A speed control device for a bicycle according to claim 1, wherein a spare engaging portion is provided between said intermediate engaging portion and said displacement engaging portion.

* * * * *